(12) United States Patent
Bergmann

(10) Patent No.: US 6,749,155 B2
(45) Date of Patent: Jun. 15, 2004

(54) COMPOSITE ASSEMBLY WITH INTEGRATED COMPOSITE JOINTS

(75) Inventor: Blaise F. Bergmann, Wichita, KS (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/243,251

(22) Filed: Sep. 13, 2002

(65) Prior Publication Data

US 2004/0051005 A1 Mar. 18, 2004

(51) Int. Cl.[7] ................................................. B64C 3/18
(52) U.S. Cl. ...................... 244/133; 244/131; 244/119; 403/265
(58) Field of Search ............................. 244/133, 117 R, 244/119, 123, 131; 403/335, 336, 337, 265, 267, 270, 271, 282, 403

(56) References Cited

U.S. PATENT DOCUMENTS

| | | | | |
|---|---|---|---|---|
| 3,775,238 A | * | 11/1973 | Lyman | 428/167 |
| 4,113,910 A | * | 9/1978 | Loyd | 428/162 |
| 4,256,790 A | * | 3/1981 | Lackman et al. | 428/73 |
| 4,331,495 A | * | 5/1982 | Lackman et al. | 156/93 |
| 4,395,450 A | * | 7/1983 | Whitener | 428/116 |
| 4,671,470 A | * | 6/1987 | Jonas | 244/119 |
| 4,813,202 A | * | 3/1989 | Anderson | 52/281 |
| 5,216,799 A | * | 6/1993 | Charnock et al. | 29/525.02 |
| 5,556,565 A | * | 9/1996 | Kirkwood et al. | 219/633 |
| 5,843,558 A | * | 12/1998 | Yoshizaki et al. | 428/112 |
| 5,944,286 A | * | 8/1999 | Morris et al. | 244/131 |
| 6,415,496 B1 | * | 7/2002 | Dominguez Casado et al. | 29/525.01 |

OTHER PUBLICATIONS

Norther Fiber Glass Sales, Inc., Website [online], Apr. 1999, [retrieved Jun. 9, 2003], Archived website retrieved from URL: <http://web.archive.org/web/19990427234224/http://www.nfgsales.com/>.*

* cited by examiner

Primary Examiner—Michael J. Carone
Assistant Examiner—Daniel Matz
(74) Attorney, Agent, or Firm—Ann K. Galbraith

(57) ABSTRACT

An aircraft composite assembly 10 is provided, including a first composite member 12, at least one first flange joint 26 comprising a first plurality of plies 24 cured to the first composite member 12, a second composite member 30, and at least one second flange joint 38 comprising a second plurality of plies 36 cured to the second composite member 30. The at least one second flange joint 38 is bonded to the at least one first flange joint 26 such that the first composite member 12 is affixed to the second composite member 30.

24 Claims, 2 Drawing Sheets

US 6,749,155 B2

COMPOSITE ASSEMBLY WITH INTEGRATED COMPOSITE JOINTS

TECHNICAL FIELD

The present invention relates generally to an aircraft integrated composite joints, and more particularly to an aircraft composite assembly utilizing integrated composite joints for joining contoured structural members.

BACKGROUND OF THE INVENTION

Aircraft assemblies often rely on components that share low-weight as well as high strength characteristics. Such reliance is often driven as much by efficiency and cost-effectiveness as it is by aircraft performance. It has also driven to the development of new and improved structural materials. One such category of improved structural materials has been the development of composite structural members. These composite structures are often utilized for a variety of aircraft structures including, but not limited to, skins, ribs and spars. Although these structures can provide significant benefits to aircraft design, they can create issues regarding connectivity that must be properly addressed.

Often connectivity of such composite structures requires the use of fasteners and specialized tooling. This can lead undesirably to an increase in cost for production and assembly of the aircraft structure. Additionally, fastener attachment location may require redesign and reengineering of the composite structures in localized areas further adding to the cost and time required for production. Finally, structural modification of the composite structure to accommodate fastener usage, as well as the presence of the fasteners themselves, may unnecessarily add to the weight and complexity of the composite structure in locations where loading or failsafe requirements do not require their presence.

It would, therefore, be highly desirable to have a simple and cost-efficient method of attaching composite structures, such as contoured structural members. The method would preferably be implementable onto existing structural member designs such that undesirable increases in tooling and manufacturing costs are not realized. Furthermore, it would be preferable to have a method for joining multiple composite structures that provided a flexible solution capable of utilization on a wide variety of contoured structures without requiring expensive redesign of the contoured structures themselves.

SUMMARY OF THE INVENTION

It is, therefore, an object of the present invention to provide an aircraft composite member with integrated composite joints and method of making same. It is a further object of the present invention to provide an aircraft composite assembly with adhesively bonded integrated composite joints.

In accordance with the objects of the present invention, an aircraft composite assembly is provided. The aircraft composite assembly includes a first structural member having at least one slotted flange joint. The at least one slotted flange joint is comprised of a plurality of flange joint plies cured to the first structural member. The aircraft composite assembly further includes a second structural member having at least one tabular flange joint. The at least one tabular flange joint is comprised of a plurality of tabular joint plies cured to the second structural member. The at least one tabular flange joint is positioned within, and bonded to, the at least one slotted flange joint such that the first composite member is affixed to the second structural member.

Other objects and features of the present invention will become apparent when viewed in light of the detailed description of the preferred embodiment when taken in conjunction with the attached drawings and appended claims.

DESCRIPTION OF THE PREFERRED EMBODIMENTS(S)

Figure 1:
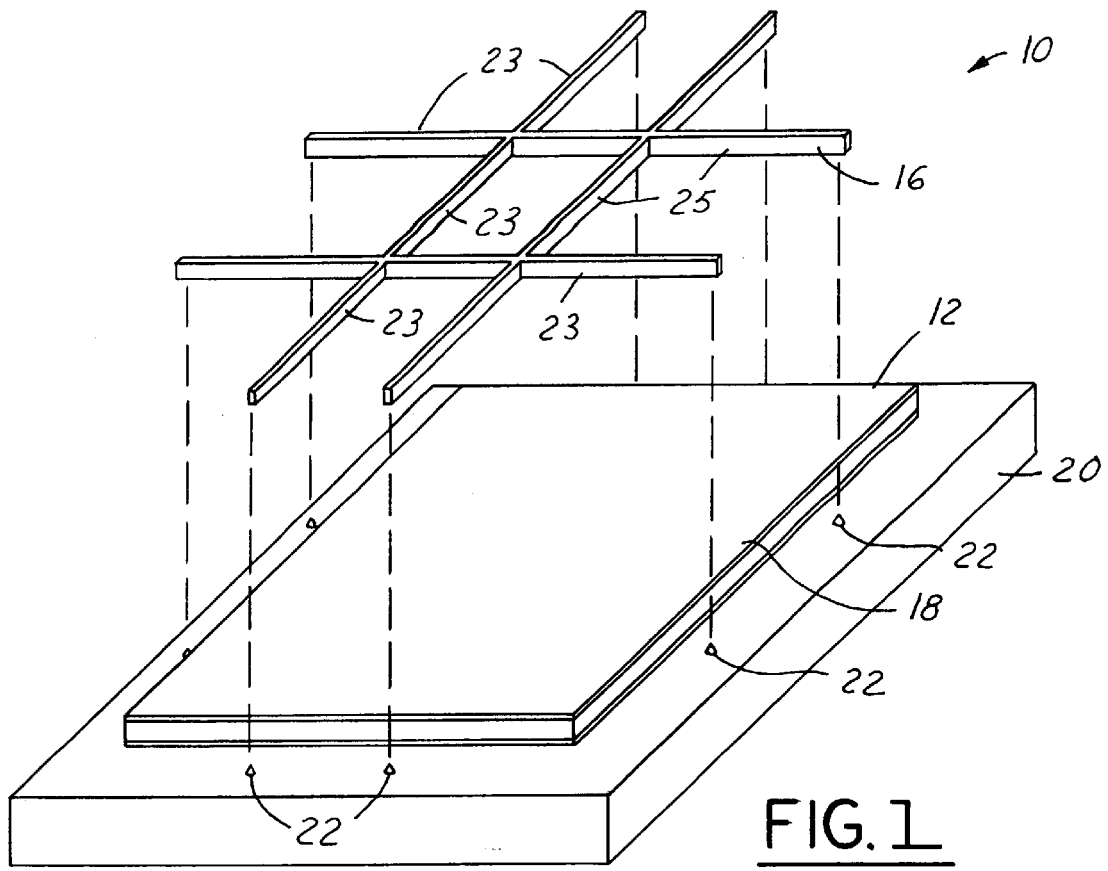
FIG. 1 is an illustration of a method of making a composite assembly with an integrated composite joint in accordance with the present invention.

Referring now to FIG. 1, which is an illustration of an aircraft composite assembly and method of making same 10 in accordance with the present invention. The aircraft composite assembly 10 is intended for use in a wide variety of aircraft applications. These applications include, but are not limited to, skins, ribs and spars. The aircraft composite assembly 10 includes a first structural member 12. Although the structural member 12 is commonly referred to as a composite member, it is intended that the structural member include a variety of cores such as laminates. The first structural member 12 is preferably an un-cured composite member. It is contemplated that in alternate embodiments, the first structural member 12 may be pre-cured. It should be understood that a wide variety of composite materials and members are contemplated by the present invention. Furthermore, although the first composite member 12 is illustrated as a planar member, the present invention is applicable to a wide variety of contoured composite members.

Figure 2:
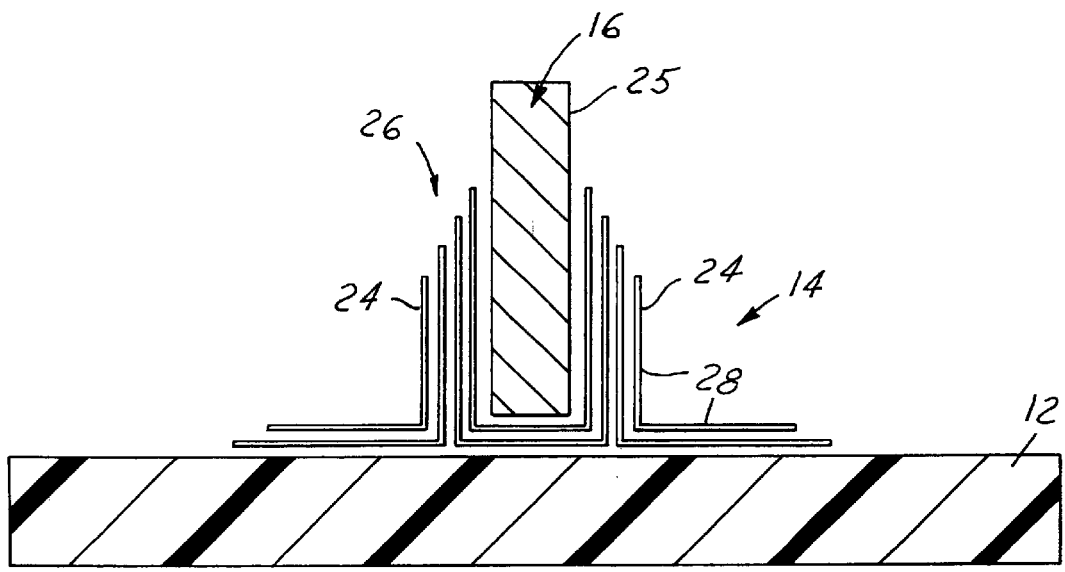
FIG. 2 is a side view illustration of a method of making a composite assembly with an integrated composite joint in accordance with the present invention, the illustration showing a slotted flange joint design.

The aircraft composite assembly 10 further includes a first integrated composite joint 14 (see FIG. 2) applied to and cured onto the first composite member 12. In one embodiment, it is contemplated that the first integrated composite joint 14 is applied to the uncured composite member 12 and the combination is cured together. Although this may be accomplished in a variety of fashions, FIG. 1 illustrates the use of a first tooling mandrel 16. The first tooling mandrel 16 is placed on the backside surface 18 of the first composite member 12. In the embodiment illustrated, a lay-up tool 20 with pinning provisions 22 is utilized to secure the first tooling mandrel 16 as well as insure its proper position on the first composite member 12. The pinning provisions 22 are preferably positioned outside the boundary of the first composite member 12. Although it is contemplated that the first tooling mandrel 16 can be formed in a variety of shapes and configurations, one embodiment contemplates the use of a cross-hatched shaped mandrel. The first tooling mandrel 16 is intended to simulate all structures (location, width, interfacing angle, etc.) which will be subsequently jointed to the first composite member 12 during final assembly. In one embodiment, it is contemplated that the first tooling mandrel 16 include a plurality of first mandrel sections 23 that are parallel to facilitate removal of the first tooling mandrel 16 in post-curing operations. Alternate embodiments contemplate that the plurality of first mandrel sections 23 can be formed in sections to allow for non-parallel geometry while still facilitating post-cure removal. The tooling surface 25 of the first tooling mandrel 16 may also include additional features such as grooves or ridges to facilitate higher strength adhesive bonds.

The first integrated composite joint 14 is created by laying up a plurality of plies 24 against the first tooling mandrel 16 and first composite member 12. Although the first integrated composite joint 14 can be formed in a variety of fashions, it is contemplated that it is formed as at least one flange joint 26. The at least one flange joint 26 is preferably formed as a slotted flange joint. It is again contemplated that the physical characteristics (location, width, interface angle) of the at least one flange joint 26 may be modified to properly serve to attach the first composite member 12 to adjoining structures. Additionally, although modification of the assembly procedures is contemplated, one approach contemplates curing of the at least one flange joint 26 to the first composite member 12 while the first tooling mandrel 16 is in place. After curing, the fist tooling mandrel 16 is removed and the first composite member 12 can be machined to proper dimensions for assembly. The plurality of plies 24 can include peel ply applied to the first tooling mandrel 16 to yield a bondable flange surface 28 on the at least one flange joint 28. Alternately, a post-cure operation could be utilized to prepare the flange surface 28 for bonding.

Figure 4:
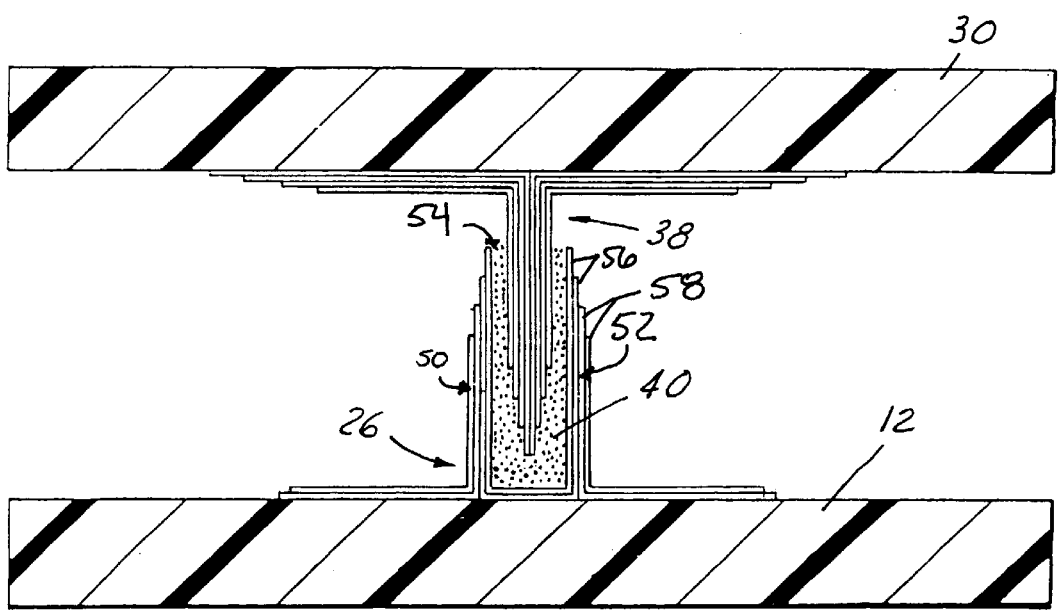
FIG. 4 is side view illustration of a composite member assembly in accordance with the present invention.
Figure 5:
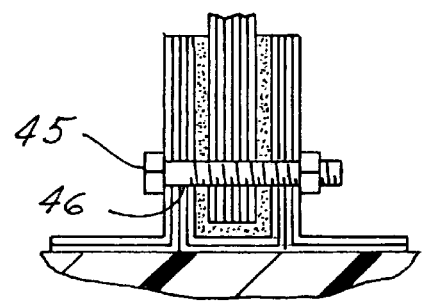
FIG. 5 is a detailed illustration of an embodiment of a composite member assembly in accordance with the present invention.

The at least one slotted flange joint 26 preferably is comprised of a first flange element 50 extending from the first composite member 12 and a second flange element 52 extending from the first composite member 12. These flange elements 50, 52 are preferably parallel such that a slot chamber 54 is formed between them. The tabular shaped flange joint 32 is designed to fit within the slot chamber 54 to allow easy assembly of the slotted flange joint and the tabular shaped flange joint 32. This allows the first composite member 12 to be easily mounted to the second composite member 30 by inserting the tabular shaped flange joint 32 into the slot chamber 54 and bonding the joints 32, 26 together. Although the slotted flange joint 26 can be formed in a variety of fashions, FIG. 4 illustrates one preferred configuration. The slotted flange joint 26 is preferably comprised of a plurality of u-shaped plies 56 forming the slot chamber 54 and a plurality of l-shaped plies 58 cured to the u-shaped plies 56 and the first composite member 12. The plurality of l-shaped plies 58 form the first flange element 50 and the second flange element 52.

Figure 3:
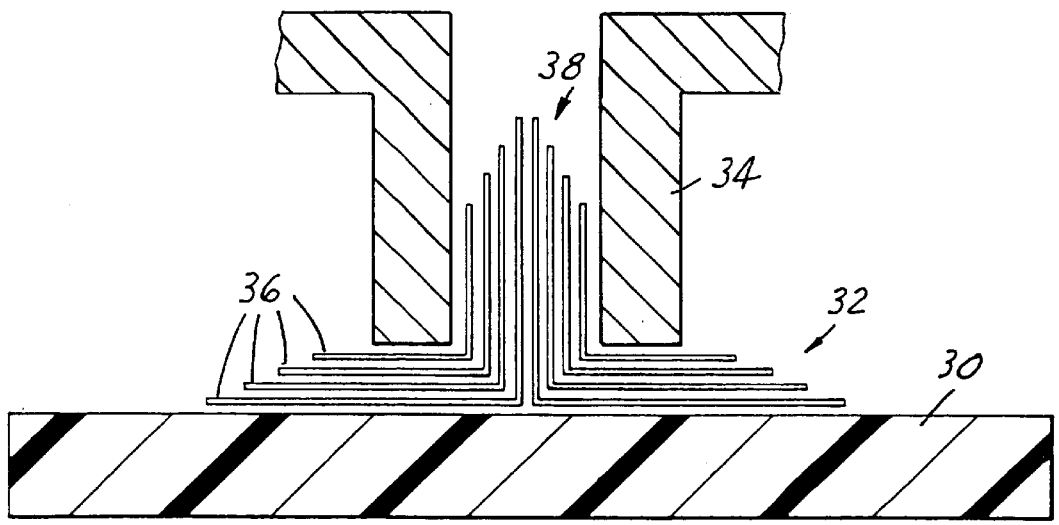
FIG. 3 is a side view illustration of a method of making a composite assembly with an integrated composite joint in accordance with the present invention, the illustration showing a tabular joint design.

The aircraft composite assembly 10 can further include a second structural member 30 (see FIG. 3). The second structural member 30, second composite member 30, includes a second integrated joint 32 formed in a similar fashion to the first integrated composite joint 14. A second tooling mandrel 34 may be utilized in combination with a second plurality of plies 36 to form at least one second flange joint 38. While it is contemplated that the at least one second flange joint 38 may take on a variety of shapes and configurations, one embodiment contemplates the use of a tabular shaped flange joint 32 formed to fit within the slotted flange joint 26 formed on the first composite member 12. It should be understood that the tabular shaped flange joint 32 may be formed in any fashion and need not be a composite. Again, the second plurality of plies 36 can include a peel ply to create a bondable flange surface 28 or alternately post-cured operations can be utilized. The first composite member 12 and the second composite member 30 can then be assembled by positioning the at least one tabular flange joint 38 within the slotted flange joint 26 and securing the joints with adhesive 40 (see FIG. 4). This allows the aircraft composite assembly 10 to be assembled with a minimum amount of tooling. For example, flanges could be integrated onto a wing skin for attachment of all spars and ribs. Flanges could also be integrated onto the spars for attachment to the ribs. Although one embodiment of flange shapes (slotted 26 and tabular 38) have been illustrated, it should be understood that a wide variety of flange shapes could be utilized by the present invention.

It is further contemplated that fasteners 45 may be utilized within fastener slots 46 to further secure the tabular shaped flange joint 32 to the slotted flange joint 26. This provides a plurality of benefits to the aircraft composite assembly 10. Fasteners 45 can be used in combination with the present invention when adhesive bond strength is inadequate to meet load requirements. Furthermore, the use of fasteners 45 may be utilized to secure the proper position of the tabular shaped flange joint 32 within the slotted flange joint 26 until the adhesive 40 is properly set. This can help insure a proper distribution of the adhesive 40 around the tabular shaped flange joint.

While particular embodiments of the invention have been shown and described, numerous variations and alternative embodiments will occur to those skilled in the art. Accordingly, it is intended that the invention be limited only in terms of the appended claims.

What is claimed is:

1. An aircraft composite assembly comprising:
   a first composite member;
   at least one slotted flange joint comprising a first plurality of plies applied and cured to said first composite member, said at least one slotted flange joint comprising: a first flange element extending from said first composite member; a second flange element extending from said first composite element and parallel to said first flange element, and a slot chamber positioned between said first flange element and said second flange element, said slot chamber having an upper opening opposite said first composite member;
   a second composite member; and
   at least one tabular flange joint comprising a second plurality of plies applied and cured to said second composite member, said at least one tabular flange joint positioned within said slot chamber and bonded to said at least one slotted flange joint such that said first composite member is affixed to said second composite member, said at least one slotted flange joint and said at least one tabular flange joint cured prior to said positioning of said at least one tabular flange joint within said slot chamber.

2. An aircraft composite assembly as described in claim 1, wherein at least one slotted flange joint is applied to said first composite member when said first composite member is in an un-cured state.

3. An aircraft composite assembly as described in claim 1, wherein at first plurality of plies includes at least one peel ply.

4. An aircraft composite assembly as described in claim 1, wherein said at least one tabular flange joint is bonded to said at least one slotted flange joint by way of an adhesive positioned between said at least one tabular flange joint and said at least one slotted flange joint.

5. An aircraft composite assembly as described in claim 1, wherein said at least one slotted flange joint is positioned on a backside surface of said first composite member.

6. An aircraft composite assembly as described in claim 1, further comprising:

a first fastener slot formed in said at least one slotted flange joint;

a second fastener slot formed in said at least one tabular flange joint; and at least one fastener positioned within said first fastener slot and said second fastener slot.

7. An aircraft composite assembly comprising:

a first structural member;

at least one first flange joint comprising a first plurality of plies cured to said first structural member;

a second structural member; and at least one second flange joint comprising a second plurality of plies cured to said second structural member, said at least one second flange joint assembled with and bonded to said at least one first flange joint such that said first structural member is affixed to said second structural member, said at least one second flange joint and said at least one first flange joint cured prior to said assembly.

8. An aircraft composite assembly as described in claim 7, wherein said at least one first flange joint comprises a slotted flange joint.

9. An aircraft composite assembly as described in claim 7, wherein said at least one second flange joint comprises a tabular flange joint.

10. An aircraft composite assembly as described in claim 7, wherein at least one first flange joint is applied to said first structural member when said first structural member is in an un-cured state.

11. An aircraft composite assembly as described in claim 7, wherein at least one second flange joint is applied to said second structural member when said second structural member is in an un-cured state.

12. An aircraft composite assembly as described in claim 7, wherein at first plurality of plies includes at least one peel ply.

13. An aircraft composite assembly as described in claim 7, wherein at second plurality of plies includes at least one peel ply.

14. An aircraft composite assembly as described in claim 7, wherein said at least one first flange joint is bonded to said at least one second flange joint by way of an adhesive positioned between said at least one second flange joint and said at least one first flange joint.

15. An aircraft composite assembly as described in claim 7, wherein said at least one first flange joint is formed in a cross-hatch shape.

16. An aircraft composite assembly as described in claim 1, further comprising:

a first fastener slot formed in said at least one first flange joint;

a second fastener slot formed in said at least one second flange joint; and at least one fastener positioned within said first fastener slot and said second fastener slot.

17. A method of joining aircraft composite members comprising:

placing a first tooling mandrel onto an uncured first composite member;

laying up a first plurality of plies against said first tooling mandrel to create at least one first flange joint;

curing said first composite member and said first plurality of plies to create a first integrated composite joint;

removing said first tooling mandrel from said first composite member;

placing a second tooling mandrel onto an uncured second composite member;

laying up a second plurality of plies against said second tooling mandrel to create at least one second flange joint;

curing said second composite member and said second plurality of plies to create a second integrated composite joint;

removing said second tooling mandrel from said second composite member; and bonding said first integrated composite joint to said second integrated composite joint.

18. A method as described in claim 17, further comprising:

applying pre-ply to said first tooling mandrel to create a bondable flange surface on said first integrated composite joint.

19. A method as described in claim 17, further comprising:

placing said first composite member onto a lay-up tool.

20. A method as described in claim 19, further comprising:

locating and securing said first tooling mandrel through the use of a plurality of pinning provisions.

21. A method as described in claim 19, wherein said first tooling mandrel comprises a plurality of first mandrel sections.

22. A method as described in claim 21, wherein said plurality of first mandrel sections are parallel to facilitate removal of said first tooling mandrel.

23. A method as described in claim 18, further comprising:

machining said first composite member.

24. An aircraft composite assembly as described in claim 1, wherein said at least one slotted flange joint comprises:

a plurality of u-shaped plies forming said slot chamber; and a plurality of l-shaped plies cured to said u-shaped plies and said first composite member, said plurality of l-shaped plies forming said first flange element and said second flange element.

* * * * *